US011194396B1

(12) United States Patent
Wang et al.

(10) Patent No.: US 11,194,396 B1
(45) Date of Patent: Dec. 7, 2021

(54) ELECTRONIC DEVICES WITH FABRIC ACTUATORS

(71) Applicant: Apple Inc., Cupertino, CA (US)

(72) Inventors: Paul X. Wang, Cupertino, CA (US); Jie Gu, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 16/742,457

(22) Filed: Jan. 14, 2020

Related U.S. Application Data

(60) Provisional application No. 62/837,634, filed on Apr. 23, 2019.

(51) Int. Cl.
*G06F 3/01* (2006.01)
*G06F 3/041* (2006.01)
*D03D 1/00* (2006.01)
*H01F 7/16* (2006.01)

(52) U.S. Cl.
CPC ........... *G06F 3/016* (2013.01); *D03D 1/0088* (2013.01); *G06F 3/0414* (2013.01); *H01F 7/1653* (2013.01); *D10B 2403/02431* (2013.01)

(58) Field of Classification Search
CPC ...... G06F 3/016; G06F 3/0414; H01F 7/1653; D03D 1/0088; D10B 2403/02431
USPC ..................................................... 340/407.1
See application file for complete search history.

(56) References Cited

U.S. PATENT DOCUMENTS

| | | |
|---|---|---|
| 8,766,925 B2 | 7/2014 | Perlin et al. |
| 2006/0281382 A1 | 12/2006 | Karayianni et al. |
| 2011/0030127 A1 | 2/2011 | Dias et al. |
| 2017/0325518 A1* | 11/2017 | Poupyrev ................. D02G 3/12 |
| 2018/0038022 A1* | 2/2018 | Podhajny ............... D03D 15/00 |
| 2018/0052516 A1* | 2/2018 | Efrati ....................... G06F 3/018 |
| 2018/0068538 A1* | 3/2018 | Kessler ................... G04G 17/06 |
| 2018/0120940 A1 | 5/2018 | Kessler et al. |
| 2018/0158290 A1* | 6/2018 | Khoshkava ............... H02J 7/02 |
| 2018/0301140 A1* | 10/2018 | Turcott ................. G06N 3/0445 |
| 2018/0373331 A1 | 12/2018 | Holbery et al. |
| 2020/0142485 A1* | 5/2020 | Ma ........................ D03D 1/0088 |
| 2020/0253294 A1* | 8/2020 | Van de Zande ........ G06F 3/011 |

\* cited by examiner

*Primary Examiner* — Hirdepal Singh
(74) *Attorney, Agent, or Firm* — Treyz Law Group, P.C.; Jason Tsai (57) ABSTRACT

A fabric item may have control circuitry and input-output devices. A fabric haptic output device may be formed in the fabric item. The fabric haptic output device may be based on an electromagnetic fabric actuator, a piezoelectric fabric actuator, or other actuator formed from fabric. The fabric actuator may have a permanent magnet portion and an electromagnet portion. During operation, signals supplied to a coil in the electromagnet portion may create a magnetic field that moves the permanent magnet portion. Fabric support structures may be used to support an electromagnet or permanent magnet. Fabric springs may be coupled between the fabric support structures and the electromagnet or permanent magnet. The fabric of the support structures, magnetic structures, and springs may be incorporated into a wearable fabric structure, part of a cover or case for a device, a housing structure such as a housing wall, or other fabric structure.

27 Claims, 9 Drawing Sheets

ELECTRONIC DEVICES WITH FABRIC ACTUATORS

This application claims the benefit of provisional patent application No. 62/837,634, filed Apr. 23, 2019, which is hereby incorporated by reference herein in its entirety.

FIELD

This relates generally to electronic devices, and, more particularly, to electronic devices with actuators.

BACKGROUND

Electronic devices such as computers include input-output devices. Input-output devices such as touch sensors and buttons may be used to gather input from a user. Input-output devices such as displays, speakers, and haptic output devices are used to supply output to the user. For example, an electronic device may have a touch sensor for gathering touch input and may have an actuator that provides haptic feedback as touch input is being gathered.

If care is not taken, the input-output devices of an electronic device may be formed from materials that are bulky, are uncomfortable to the touch, are unsightly, or have other properties that detract from using these input-output in the electronic device.

SUMMARY

A fabric item may have control circuitry and input-output devices. The item may form a cover or other enclosure, may have fabric that forms a housing wall, may be a wearable item with fabric, or may be another fabric-based item.

A fabric haptic output device may be formed in the fabric item. The fabric haptic output device may be based on an electromagnetic fabric actuator, a piezoelectric fabric actuator, or other actuator formed from fabric.

In an illustrative configuration, the fabric actuator has a permanent magnet portion and an electromagnet portion. During operation, control circuitry supplies signals to a coil in the electromagnet portion to create a magnetic field that moves the permanent magnet portion. This provides a user with haptic output.

Fabric support structures may be used to support the electromagnet and/or permanent magnet portions. Fabric springs may be coupled between the fabric support structures and an electromagnet or permanent magnet. In some arrangements, electromagnets and/or permanent magnets may be formed within fabric support structures (e.g., by embedding coils and/or magnetic material into the fabric support structures). The fabric of the support structures, magnetic structures, and springs may be incorporated into a wearable fabric structure, part of a cover or case for a device, a housing structure such as a housing wall, or other device with fabric.

DETAILED DESCRIPTION

An item may be provided with haptic output devices. The haptic output devices may provide vibrations and other haptic output to a user during operation. As an example, a haptic output device may provide a user with haptic feedback whenever the user touches a touch sensor or provides force input to a force sensor. In this way, a user may be provided with physical feedback that helps confirm to the user when sensor input has been successfully received. A haptic output device may also be used to provide a user with haptic output that serves as a notification. For example, a user may be alerted that a message has been received or that a timer has expired.

To facilitate incorporation of haptic output devices into a variety of different items, the haptic output devices may be partly or completely formed from intertwined strands of material. The strands of material may, for example, be intertwined to form fabric using braiding, weaving, knitting, or other strand intertwining process. The fabric can be used in forming a housing for an item, a band for a wristwatch, an item of clothing, a cover, a wearable structure, or other fabric-based structure. Items with haptic output devices and other circuitry may sometimes be referred to herein as electronic devices.

Figure 1:
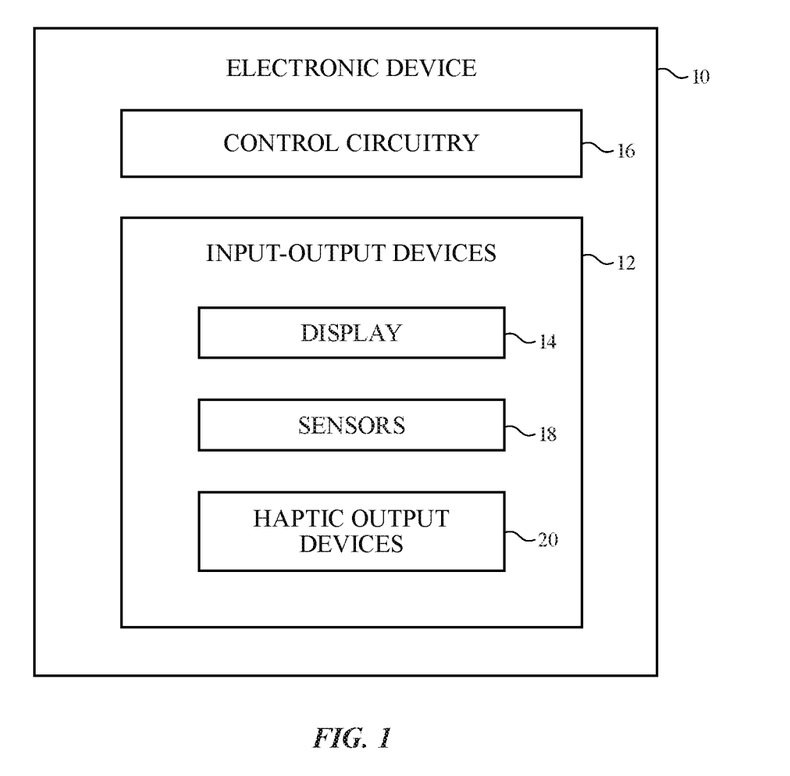
FIG. 1 is a schematic diagram of an illustrative electronic device in accordance with an embodiment.

An illustrative electronic device is shown in FIG. 1. Electronic device 10 may be a computing device such as a laptop computer, a computer monitor containing an embedded computer (e.g., a desktop computer formed from a display with a desktop stand that has computer components embedded in the same housing as the display), a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, a tower computer, an item of furniture, an embedded system such as a system in which electronic equipment is mounted in a kiosk or automobile, equipment that implements the functionality of two or more of these devices, or other electronic equipment. If desired, device 10 may be a removable external case for electronic equipment, may be a strap, may be a wristband or headband, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, sock, glove, shirt, pants, etc.), or may be any other suitable fabric-based item.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include wired and/or wireless communications circuitry (e.g., antennas and associated radio-frequency transceiver circuitry such as cellular telephone communications circuitry, wireless local area network communications circuitry, etc.). The communications circuitry of control circuitry 16 may allow device 10 to communicate with keyboards, computer mice, remote controls, speakers, accessory displays, accessory cameras, and/or other electronic devices that serve as accessories for device 10.

Input-output circuitry in device 10 such as input-output devices 12 may be used to allow data to be supplied to device 10 and to allow data to be provided from device 10 to external devices. Input-output devices 12 may include input devices that gather user input and other input and may include output devices that supply visual output, audible output, or other output. These devices may include buttons, joysticks, scrolling wheels, touch pads, devices with force and/or touch sensor input devices, key pads, keyboards, microphones, speakers, tone generators, vibrators and other haptic output devices, light-emitting diodes and other status indicators, data ports, etc.

Input-output devices 12 may include one or more displays such as display 14. Devices 12 may, for example, include an organic light-emitting diode display, a liquid crystal display, a projector display (e.g., a projector based on a micromechanical systems device such as a digital micromirror device or other projector components), a display having an array of pixels formed from respective light-emitting diodes (e.g., a pixel array having pixels with crystalline light-emitting diodes formed from respective light-emitting diode dies such as micro-light-emitting diode dies), and/or other displays. Display 14 may be a touch screen display that includes a touch sensor for gathering touch input from a user or display 14 may be a touch insensitive display that is not sensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. If desired, display 14 may have a force sensor for gathering force input (e.g., a two-dimensional force sensor may be used in gathering force input on display 14). In some configurations, edge lit light-guide layers or other light-emitting components may be used to produce illumination for device 10 and can replace one or more displays 14 and/or portions of displays 14 in device 10. In general, any suitable light-emitting devices (displays, light-emitting diodes, lasers, lamps, etc.) may be used in emitting light.

Input-output devices 12 may also include sensors 18. Sensors 18 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor and/or a two-dimensional force sensor overlapping display 14, and/or a touch sensor or force sensor that forms a button, trackpad, or other input device not associated with a display), and other sensors. If desired, sensors 18 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors. In some arrangements, device 10 may use sensors 18 and/or other input-output devices to gather user input (e.g., buttons may be used to gather button press input, touch and/or force sensors overlapping displays can be used for gathering user touch screen input and/or force input, touch pads and/or force sensor may be used in gathering touch and/or force input, microphones may be used for gathering audio input, etc.).

If desired, electronic device 10 may include additional components (e.g., other devices in input-output devices 12). The additional components may include haptic output devices 20, audio output devices such as speakers, light sources such as light-emitting diodes (e.g., crystalline semiconductor light-emitting diodes for status indicators and/or displays), other optical output devices, and/or other circuitry for gathering input and/or providing output. Haptic output devices may include fabric actuators controlled by control circuitry 16. Device 10 may also include an optional battery or other energy storage device, connector ports for supporting wired communications with ancillary equipment and for receiving wired power, and other circuitry. Systems that include device 10 may also include wired and/or wireless accessories (e.g., keyboards, computer mice, remote controls, trackpads, etc.).

If desired, haptic output devices 20 may be based on electromagnetic actuators. In some configurations, these actuator devices may include a permanent magnet and an electromagnet. The permanent magnet and the electromagnet may move relative to each other (e.g., the permanent magnet may move while the electromagnet remains stationary and/or the electromagnet may move while the permanent magnet remains stationary).

When operating the electromagnetic device as a haptic output device, the electromagnet may be supplied with a control current to create a magnetic field that moves the permanent magnet and generates haptic output. Any suitable haptic output may be provided (continuous vibrations, impulses, etc.).

If desired, electromagnetic devices such as these (e.g., haptic output devices 20 or other electromagnetic devices) may be operated as energy harvesting devices (e.g., by operating the devices "in reverse"). When operated as an energy harvesting device, movement of device 10 (e.g., due to a user's motions or other motions) causes the permanent magnet and electromagnet to move relative to each other. Movement of the permanent magnet relative to the electromagnetic creates a time-changing magnetic field at the electromagnet that induces a current in the coil of the electromagnet. This current can be used to power components in device 10 (e.g., to operate electrical components, to store in a battery, capacitor, or other energy storage device, etc.). If desired, the coil of the electromagnet (and/or other coils in device 10 such as coils formed in fabric) can be used as near-field communications antennas, haptic output device components, wireless power receiving and/or transmitting antennas, and/or other components.

Figure 2:
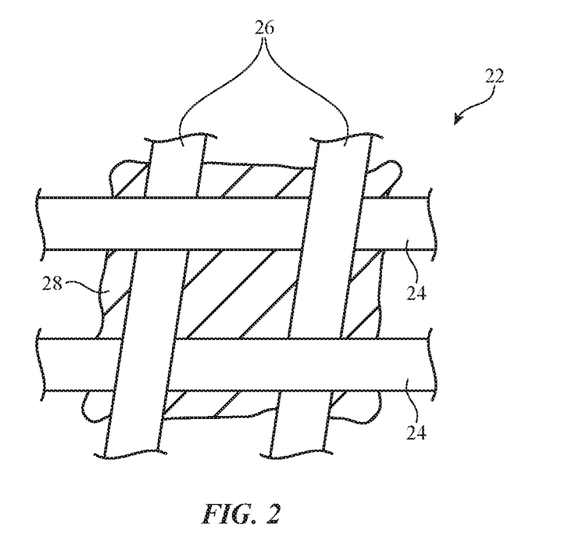
FIG. 2 is a top view of illustrative fabric in accordance with an embodiment.

FIG. 2 is a top view of illustrative fabric 22 for use in device 10. Fabric 22 includes intertwined strands of material such as strands 24 and 26. Structural portions of device (item) 10 such as housing structures, wristbands, headbands, other wearable components, housing walls that serve as covering layers, and other portions of device 10 may be formed from fabric 22. Haptic output devices 20 and other input-output devices 12 may also include fabric 22. Fabric 22 may form all or part of a housing wall or other layer in electronic device 10, may form internal structures in electronic device 10, or may form other fabric-based structures. Device 10 may be soft (e.g., device 10 may have a fabric surface that yields to a light touch), may have a rigid feel (e.g., the surface of device 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

The strands of material in fabric 22 may be single-filament strands (sometimes referred to as fibers or monofilaments), may be yarns or other strands that have been formed by intertwining multiple filaments (multiple monofilaments) of material together, or may be other types of strands (e.g., tubing). The strands may include extruded strands such as extruded monofilaments and yarn formed from multiple extruded monofilaments. Monofilaments for fabric 22 may include polymer monofilaments and/or other insulating monofilaments and/or may include bare wires and/or insulated wires. Monofilaments formed from polymer cores with metal coatings and monofilaments formed from three or more layers (cores, intermediate layers, and one or more outer layers each of which may be insulating and/or conductive) may also be used.

As shown in FIG. 2, fabric 22 may include polymer or other binder 28 to hold strands such as strands 24 and 26 in fabric 22 together. Magnetic particles (e.g., particles of iron, ferrite, etc.) or other magnetic filler material may be incorporated into binder 28, if desired. In some arrangements, strands may be fused together by application of heat and/or pressure. Adhesive or other attachment mechanisms may be used to attach fabric 22 to support structures such as frame members, housing structures (e.g., an electronic device housing), and other mechanical structures.

Figure 3:
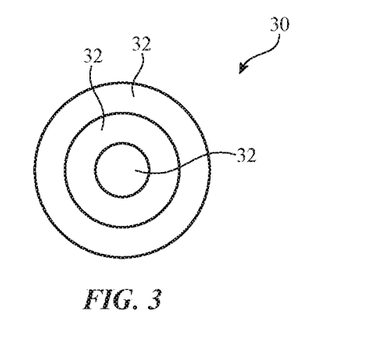
FIG. 3 is a cross-sectional side view of an illustrative strand of material for fabric in accordance with an embodiment.

FIG. 3 is a cross-sectional side view of an illustrative strand for fabric 22. Strands such a strand 30 of FIG. 3 may be used in forming strands such as strands 24 and 26 of FIG. 2. As shown in FIG. 3, strands 30 may contain one or more layers 32 (e.g., a core layer, a first coating layer on the core, a second coating layer on the first coating layer, etc.). Each of layers 32 in the strands in fabric 22 may be formed from polymer, metal, glass, graphite, ceramic, natural materials as cotton or bamboo, or other organic and/or inorganic materials and/or combinations of these materials. Conductive coatings such as metal coatings may be formed on non-conductive material. For example, plastic yarns and monofilaments in fabric 22 may be coated with metal to make them conductive. Optional insulating coatings may be formed on conductive coatings. Yarns may be formed from a bundle of bare metal wires, insulated metal wires, or metal wire intertwined with insulating monofilaments (as examples). In some arrangements, magnetic material (e.g., iron, ferrite, or other magnetic material) may be used in forming one or more layers in strands 30.

Strands of material may be intertwined to form fabric 22 using intertwining equipment such as weaving equipment, knitting equipment, or braiding equipment. Intertwined strands may, for example, form woven fabric, knit fabric, braided fabric, etc. Conductive strands and insulating strands may be woven, knit, braided, or otherwise intertwined to form contact pads that can be electrically coupled to conductive structures in device 10 such as the contact pads of an electrical component (e.g., using solder, conductive adhesive, welds, crimped connections, etc.). In some configurations, contacts of an electrical component may be directly coupled to an exposed metal segment along the length of a conductive yarn or monofilament.

Conductive and insulating strands may also be woven, knit, or otherwise intertwined to form conductive paths. The conductive paths may be used in forming signal paths (e.g., signal buses, power lines, spiral shapes, circular coils, springs, etc.), may be used in forming part of a capacitive touch sensor electrode, a resistive touch sensor electrode, a haptic output device, or other input-output device, or may be used in forming other patterned conductive structures. Conductive structures in fabric 22 may be used in carrying power signals, digital signals, analog signals, sensor signals, control signals, data, input signals, output signals, or other suitable electrical signals. Magnetic structures in fabric 22 may be used in forming magnets and/or structures that attract magnets.

Circuitry such as control circuitry 16 and input-output devices 12 of FIG. 1 may be included in device 10. This circuitry may include electrical components that are coupled to fabric 22, electrical components that are housed within an interior region of an enclosure formed by fabric 22, electrical components that are attached to fabric 22 using welds, solder joints, adhesive bonds (e.g., conductive adhesive bonds such as anisotropic conductive adhesive bonds or other conductive adhesive bonds), crimped connections, or other electrical and/or mechanical bonds. The circuitry for device 10 may include metal structures for carrying current, electrical components such as integrated circuits, light-emitting diodes, sensors, controller circuitry for applying currents and/or magnetic fields to materials, electrically controlled devices for illuminating tubing and/or applying control signals to tubing or other strands, and other electrical devices. Control circuitry 16 may be used to control the operation of device 10 by controlling electrically controllable (electrically adjustable) components in device 10 and may be used to support communications with external equipment.

Figure 4:
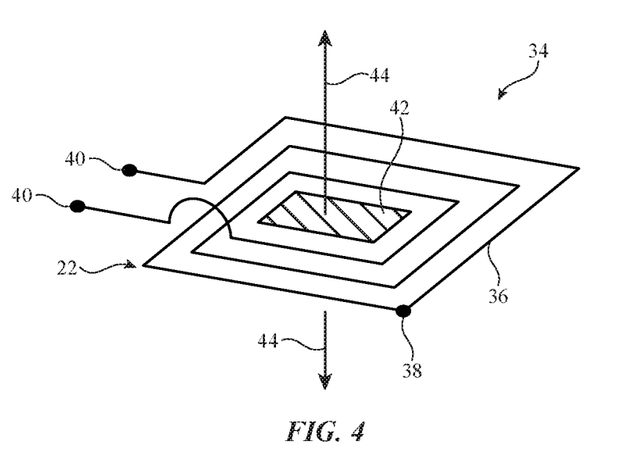
FIG. 4 is a perspective view of an illustrative electromagnetic fabric actuator in accordance with an embodiment.

FIG. 4 shows illustrative structures that may be used in fabric 22 to form a fabric-based haptic output device (e.g., one of devices 20 of FIG. 1). As shown in the example of FIG. 4, fabric 22 may include a coil such as coil 36 and a magnet such as magnet 42. Fabric 22 may be woven fabric having orthogonal warp and weft strands, may be knit fabric, may be a braided structure, or may be other suitable fabric. Fabric 22 may have one or more intertwined layers. Only the portions of fabric 22 that form coil 36 and magnet 42 are shown in FIG. 4 to avoid over-complicating the drawing. Additional intertwined strands may be incorporated into layer 22, if desired (e.g., to form structural supports, to form springs, to form conductive paths between terminals 40 and control circuitry 16, etc.).

Coil 36 forms an electromagnet and, in some configurations, may have an associated magnetic core. During operation, drive signals such as direct-current or alternating-current signals may be applied to coil 36 to create haptic output. For example, alternating-current signals may be applied to terminals 40 of coil 36, to create an alternating-current magnetic field that moves magnet 42 back and forth in directions 44. Coil 36 can be formed from a conductive strand in fabric 22. Magnet 42 may be, for example, a permanent fabric magnet formed from magnetic strands in fabric 22 and/or magnetic binder that is incorporated into a fabric region with magnetic or non-magnetic strands. Spring structures formed from fabric or other material may be used to support magnet 42. For example, strands of material may be used in forming strings that suspend magnet 42 relative to surrounding support structures formed of fabric 22. In the example of FIG. 4, magnet 42 and coil 36 are coplanar. Other configurations may be used, if desired.

Coil 36 may be formed from linking multiple conductive strand segments in fabric 22 using conductive connections such as connection 38 (e.g., solder, a metal crimping structure, a weld, conductive adhesive, etc.). Magnet 42 may be created from a portion of fabric 22 that contains magnetic material that has been magnetized to form a permanent magnet. The magnetic material for magnet 42 may be provided by magnetic material in the strands that form magnet 42 and/or in magnetic filler material (e.g., polymer binder with magnetic particles) that has been formed between the strands of fabric 22.

Figure 5:
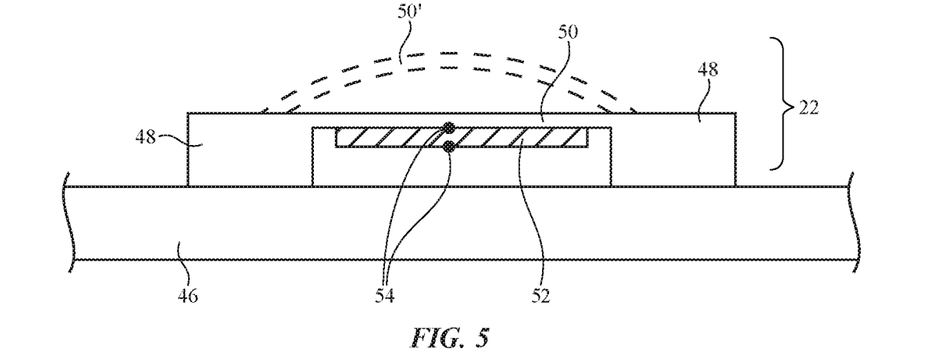
FIG. 5 is a cross-sectional side view of an illustrative piezoelectric fabric actuator in accordance with an embodiment.

FIG. 5 shows how haptic output devices 20 may be formed from piezoelectric materials. In the example of FIG. 5, fabric 22 has been configured to form deflectable member 50 between deflectable member support structures 48. Structures 48 may be coupled to additional structures 46 in device 10 (e.g., housing structures in device 10, portions of a strap, one or more layers of fabric, etc.). Piezoelectric element 52 may be coupled to member 50 and may be controlled with control signals applied across terminals 54. When a voltage is applied across terminals 54, piezoelectric element 52 deforms and deflects member 50 to a location such as location 50'. By controlling the drive signal supplied across terminals 54, desired haptic output can be provided. For example, when an alternating-current voltage is applied across terminal 54, member 50 vibrates and provides vibrating haptic output. Portions 48, beam 50, and/or structures 46 may be formed from fabric 22 and/or other materials such as polymer, metal, glass, etc. For example, strands of piezoelectric material and/or polymer binder containing piezoelectric material may be used in forming element 52. In this type of arrangement, the strands of material forming element 52 may, if desired, be intertwined with the strands of material forming member 50 (e.g., member 50 and element 52 may be formed of fabric).

FIGS. 6, 7, 8, 9, 10, 11, and 12 are diagrams of illustrative electronic devices (fabric-based items) 10 showing illustrative locations 58 at which haptic output devices 20 may be formed. The haptic output devices formed at locations 58 may be electromagnetic haptic output devices (see, e.g., illustrative electromagnetic haptic output device 34 of FIG. 4), piezoelectric haptic output devices (see, e.g., FIG. 5), and/or other haptic output devices. Portions of fabric 22 may be used in forming some or all of these haptic output devices (e.g., the haptic output devices 20 may be formed from strands of intertwined material such as strands of material in fabric 22).

Figure 6:
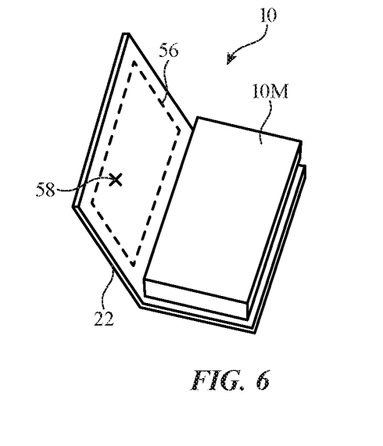
FIG. 6 is a perspective view of an illustrative fabric-based cover for a portable device in accordance with an embodiment.

In the example of FIG. 6, device 10 is a cover for removable device 10M (e.g., a removable device such as a cellular telephone or tablet computer). The cover is formed from fabric 22 and has an optional keyboard 56. A touch sensor or force may overlap one or more locations on fabric 22 such as location 58 so that haptic output can be provided as feedback when a user is providing touch and/or force input. Haptic output devices formed from fabric 22 at locations such as location 58 can also be used to provide a user with alerts (e.g., vibrating output or other haptic output when an incoming message is received or when a timer expires).

Figure 7:
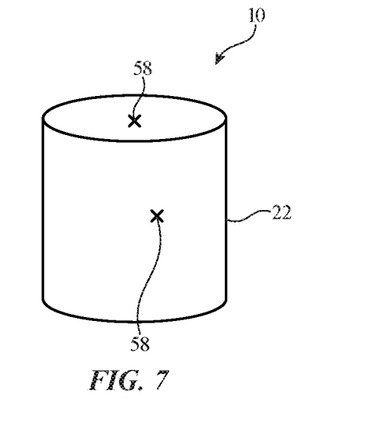
FIG. 7 is a perspective view of an illustrative voice-controlled speaker in accordance with an embodiment.

In the example of FIG. 7, device 10 is a voice-controlled speaker covered in fabric 22. Haptic output devices formed from portions of fabric 22 may be located on the top of the speaker and/or at one or more locations on the sidewalls of the speaker (see, e.g., locations 58).

Figure 8:
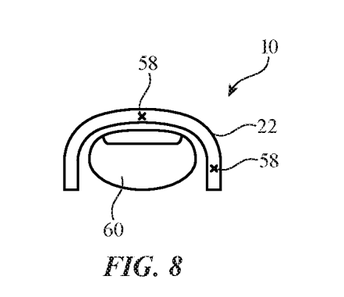
FIG. 8 is a cross-sectional end view of an illustrative finger device in accordance with an embodiment.

FIG. 8 is a cross-sectional end view of device 10 in an illustrative arrangement in which device 10 is a finger-mounted device (e.g., a device that fits on a user's finger, all or part of a glove, etc.). Fabric 22 for device 10 of FIG. 8 may, for example, be worn on one or more sides of finger 60. Haptic output devices formed from portions of fabric 22 may be incorporated into fabric 22 at one or more locations 58.

Figure 9:
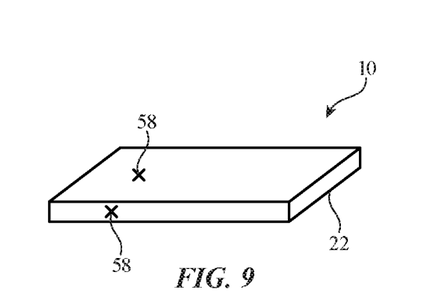
FIG. 9 is a perspective view of an illustrative charging mat in accordance with an embodiment.

In the FIG. 9 example, device 10 is a wireless charging mat. Fabric 22 forms an exterior surface for the housing of device 10. This provides device 10 with a desirable appearance and texture. Haptic output devices formed from fabric 22 may be formed at locations 58 on the upper (charging) surface of device 10 and/or sidewall surfaces.

Figure 10:
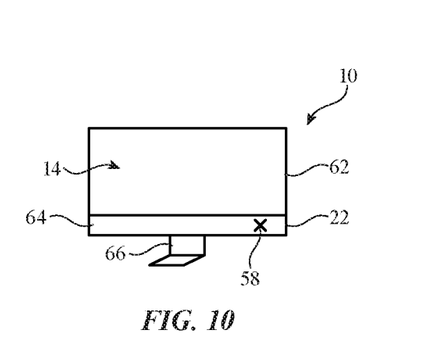
FIG. 10 is a perspective view of an illustrative desktop computer with an integrated monitor in accordance with an embodiment.

In the illustrative configuration of FIG. 10, device 10 is a desktop computer with an integrated monitor. Display 14 of device 10 may be supported in housing 62. Stand 66 may support housing 62 in a desired position relative to a tabletop or other supporting surface. Optional chin portion 64 of device 10 and/or other portions of device 10 may be formed from fabric 22. For example, fabric 22 may cover speakers and other internal components. In locations such as location 58, touch sensors may gather touch input, force sensors may gather force input, light-emitting diodes or lasers may provide light output, and haptic output devices 20 formed from fabric 22 may supply haptic output (as an example). If desired, the rear wall and/or other portions of housing 62 may be formed from fabric 22 and may include one or more haptic output devices. Haptic output devices 20 that are formed from fabric 22 may also be included in housing walls of cellular telephones, wristwatches, tablet computers, laptop computers, keyboards, headphones and other accessories, and other electrical equipment.

Figure 11:
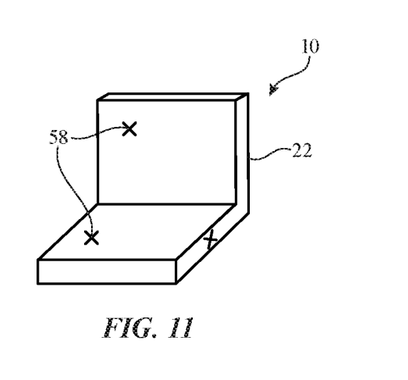
FIG. 11 is a perspective view of illustrative seat having a fabric housing in accordance with an embodiment.

FIG. 11 shows how device (item) 10 may be a seat formed from fabric 22. Haptic output devices 20 may be formed from fabric 22 at locations 58 (e.g., to provide a seated user with haptic output on the user's legs, back, or other body part).

Figure 12:
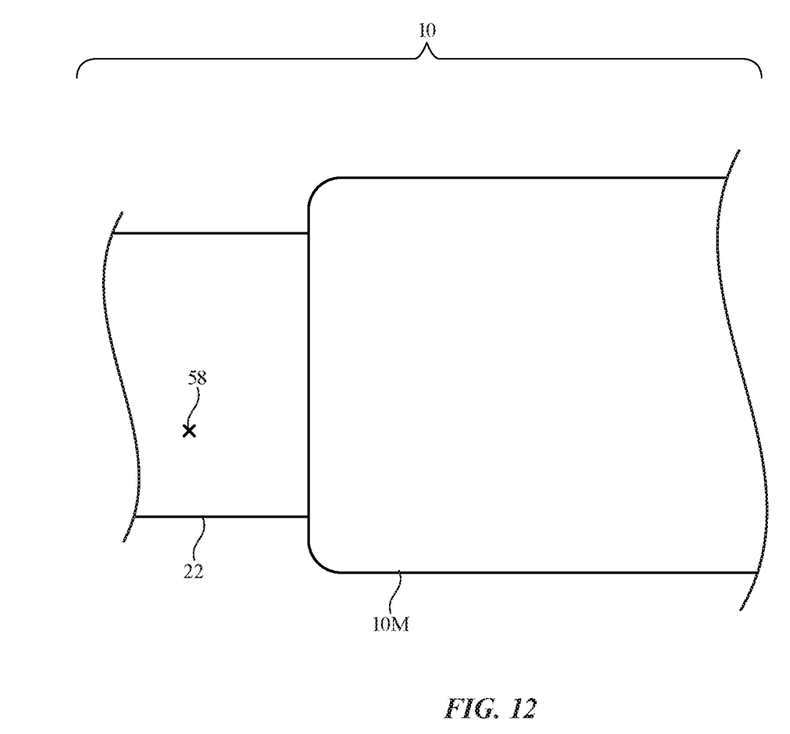
FIG. 12 is a diagram of an illustrative wearable device with a fabric band such as a head-mounted device or wristwatch in accordance with an embodiment.

FIG. 12 is a top view of an illustrative device that has a main portion 10M (e.g., a rigid housing formed from metal and glass, and/or a fabric-covered main portion or other soft main portion) and that has a fabric band formed from fabric 22. Device 10 may be a head-mounted device and fabric 22 may form a headband, device 10 may be a wristwatch device and fabric 22 may form a wristband, and/or device 10 may form other suitable fabric-based items. Haptic output devices 20 may be formed at one or more locations on the band formed from fabric 22 (see, e.g., locations 58) and/or at one or more portions of main portion 10M that include fabric 22.

Figure 13:
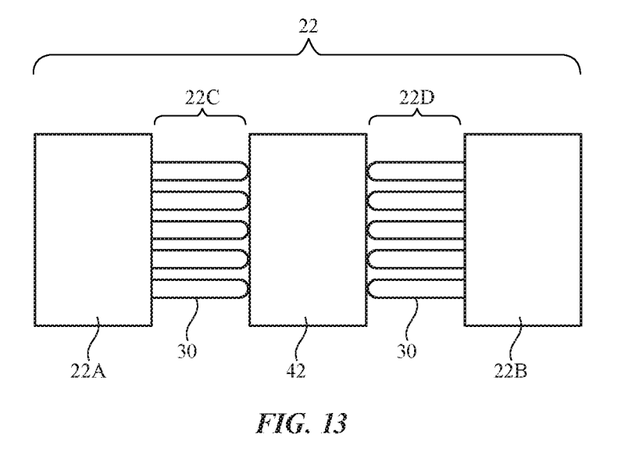
FIG. 13 is a diagram of an illustrative fabric actuator with woven springs in accordance with an embodiment.

FIG. 13 is a top view of an illustrative fabric actuator formed from fabric 22. In the illustrative configuration of FIG. 13, fabric magnet 42 is suspended between fabric portion 22A and fabric portion 22B using fabric spring 22C and fabric spring 22D. Electromagnet(s) can be formed from coil(s) 36 in the fabric of portions 22A and/or 22B or other portions of fabric 22.

Fabric springs 22C and 22D may, as an example, be formed from woven strands 30. Springs 22C and 22D may have the same length or different lengths and may, if desired, have different tensions. For example, the strands 30 that form spring 22C may be shorter and/or may have more tension than the strands formed from spring 22D, thereby providing magnet 42 with an asymmetric location relative to support structures 22A and 22B and/or providing asymmetric spring tension on magnet 42. Configurations in which the lengths of springs 22C and 22D and tensions associated with springs 22C and 22D are equal may also be used. During operation, springs 22C and 22D allow magnet 42 to move back and forth under applied forces from an electromagnet (e.g., a fabric coil such as illustrative coil 36 of FIG. 4).

Figure 14:
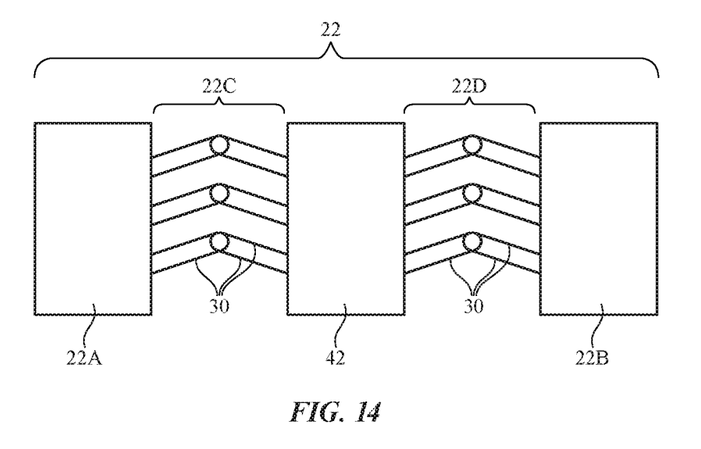
FIG. 14 is a diagram of an illustrative fabric actuator with knit springs in accordance with an embodiment.

As shown in FIG. 14, springs 22C and 22D may, if desired, be formed from knit fabric strands 30. Arrangements in which spring structures for a fabric actuator are formed from combinations of braided fabric, knit fabric, woven fabric, and/or other intertwined strands 30 may also be used.

Figure 15:
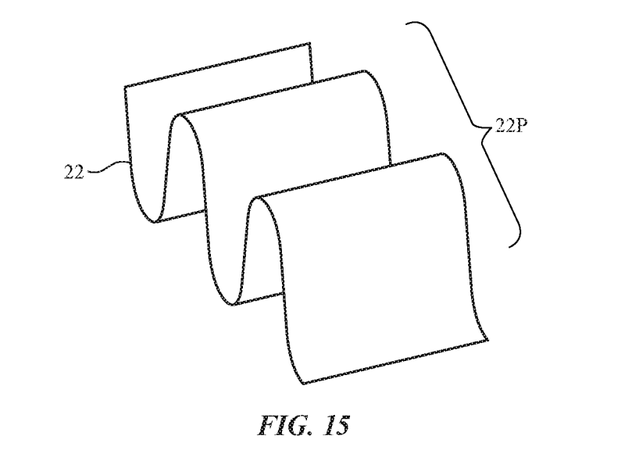
FIG. 15 is a diagram of an illustrative sheet of fabric with a wavy shape forming a spring for a fabric actuator in accordance with an embodiment.
Figure 16:
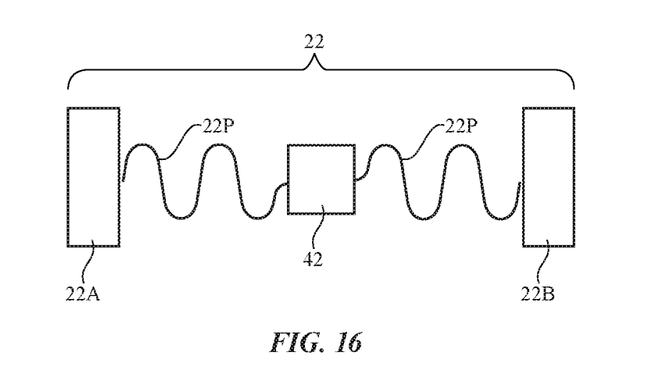
FIG. 16 is a side view of an illustrative fabric actuator with springs in accordance with an embodiment.

FIG. 15 is a perspective view of an illustrative fabric actuator spring (spring 22P) formed from a wavy sheet of fabric 22. The wavy shape of spring 22P has a serpentine cross-sectional profile and may be may be created during weaving, knitting, or during other strand intertwining operations used to form fabric 22. If desired, the shape of fabric spring 22P can be established by applying heat and pressure in a serpentine-shaped die (e.g., in a fabric structure that includes fusible strands of material, binder, etc.). A cross-sectional side view of a fabric actuator that may include fabric springs such as springs 22P of FIG. 15 is shown in FIG. 16. In the example of FIG. 16, magnet 42 is suspended between fabric portions 22A and 22B using fabric layers forming springs 22P. As with the other fabric actuators for device 10, the strands of material forming fabric 22 may extend through each of the components of the actuator. For example, a strand 30 may pass from fabric portion 22A to a first of springs 22P, may continue to extend through magnet 42 to a second of springs 22P, and may pass from spring 22P to fabric portion 22B. Arrangements in which different fabric components are joined using sewing, adhesive, or other fabric attachment techniques may also be used, if desired. In some configurations, springs 22P may be coil springs formed from coiled metal strands and/or other coiled structures in fabric 22.

Figure 17:
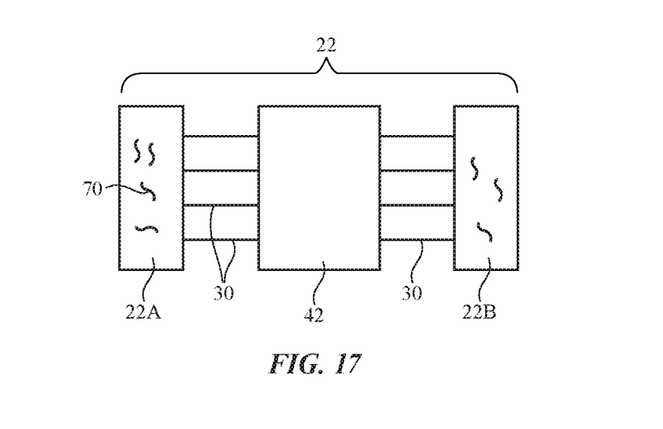
FIG. 17 is a diagram of an illustrative fabric actuator with magnets formed from magnetic binder in supporting regions of fabric in accordance with an embodiment.

As shown in FIG. 17, portions 22A and 22B of fabric 22 may include binder with magnetic material 70 (e.g. magnetic particles embedded in polymer). By incorporating magnetic material into portions 22A and 22B and applying a magnetic field to magnetize portions 22A and 22B, portions 22A and/or 22B may be formed into permanent magnets for a fabric actuator. Magnet 42 in this type of arrangement may be, as an example, an electromagnet having a coil controlled by control circuitry 16. Springs formed from strands 30 may be coupled between the electromagnetic and the magnets formed from portions 22A and 22B.

Figure 18:
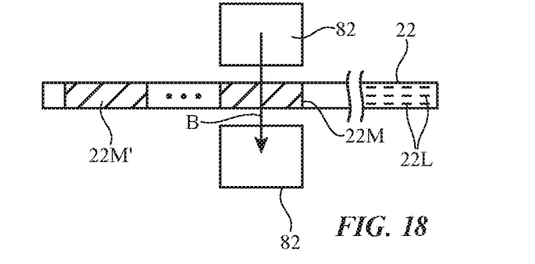
FIG. 18 is a side view of illustrative fabric with magnetic material that is being magnetized by magnetizing tool in accordance with an embodiment.

FIG. 18 is a cross-sectional side view of an illustrative fabric 22 that has been magnetized by a magnetization tool having external magnets 82. Fabric 22 may include one or more portions formed from strands of magnetic material and/or portions containing binder that includes magnetic material. Fabric 22 may, if desired, include one or more layers 22L. Layers 22L in fabric 22 of FIG. 18 and other fabric 22 in device 10 may be joined together by weaving, knitting, braiding, other strand intertwining techniques and/or by melting (fusing) fusible strands, together, by crushing layers 22L together, by otherwise joining fabric layers under application of heat and/or pressure, by impregnating some or all of layers 22L with binder that joins layers 22L, etc. During fabric magnetization operations, the magnetization tool may use magnets 82 to apply a magnetic field B to one or more regions of fabric 22, thereby creating permanent magnet(s) such as magnet 22M. In some arrangements, multiple magnets (see, e.g., magnet 22M') may be formed in fabric 22. For example, a desired pattern of magnet domains may be formed by selectively magnetizing different areas of a layer of fabric 22 with desired polarities. Each magnetized region may form part of a different respective fabric actuator and/or magnetized regions of desired polarities may be used in creating other magnetic structures (e.g., magnetic fasteners). If desired, magnets such as magnet 22M may be formed from wires of magnetic material that are woven together, polymer strands that are coated with magnetic material and woven together, or other strands of magnetic material that are intertwined together (with or without binder).

Magnets and other structures (springs, etc.) can be formed using application of heat, chemicals, humidity, ultraviolet light or other light, etc. For example, components for a haptic output device and/or an energy harvesting device may be formed from intertwined strands of magnetic material, magnetic binder, and/or other strands of material and structures. In processing strands to form a desired component, intertwined strands may be subject to applied heat, pressure, chemicals, humidity, light, etc. to cause the strands to coalesce (e.g., to soften, melt, and/or otherwise meld together), to change shape (e.g., by conforming to the shape of a mold), to separate in places (e.g., to create gaps for allowing magnet movement), to harden (e.g., to stiffen a support structure for an electromagnet or permanent magnet), to soften (e.g., to form a spring selectively where the strands are treated), and/or to otherwise modify the strands and/or other structures (binder, etc.) being processed. With this approach, fabric may be woven or otherwise formed in bulk by intertwining strands of material followed by selective processing of portions of the strands (e.g., to selectively incorporate and magnetize magnetic binder, to selectively form springs, etc.), which converts desired portions of the fabric into electromagnetic actuators, electromagnetic harvesting devices, etc.

Figure 19:
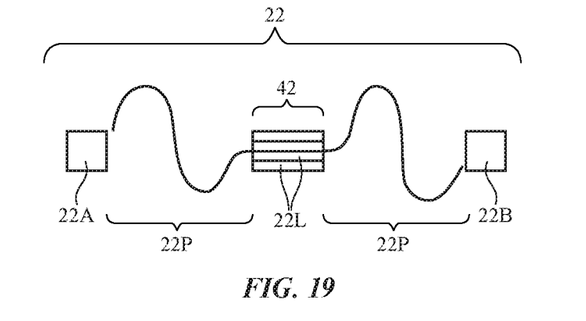
FIG. 19 is a side view of an illustrative fabric actuator with springs formed from strands of material coupled between support structures and a fabric magnet in accordance with an embodiment.

FIG. 19 shows how a fabric actuator formed from fabric 22 may have one or more strands 20 that pass through different portions of the actuator including portions 20A and 20B, springs 22P, and magnet 42. Magnet 42 may be formed from one or more fabric layers 22L (e.g., layers with magnetic material in strands and/or in binder). Magnets such as magnet 42 of FIG. 19 may be permanent magnets. If desired, an electromagnet may be used in the position of magnetic 42 of FIG. 19.

Figure 20:
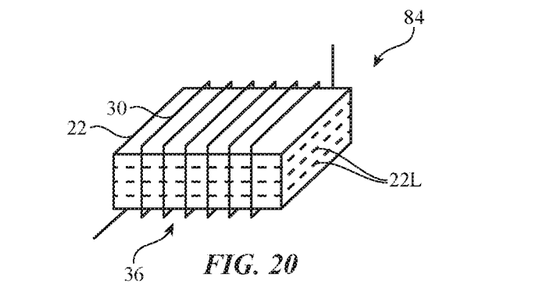
FIG. 20 is a perspective view of an illustrative electromagnet formed from a coil with a magnetic core in accordance with an embodiment.

An illustrative electromagnet 84 is shown in FIG. 20. Electromagnet 84 has an optional core of magnetic material. The core of magnetic material may be a solid magnetic member formed from ferrite, iron, or other magnetic material or may be formed from fabric 22 (e.g., one or more layers of fabric 22L) that includes strands of magnetic material and/or magnetic binder. A coil may be formed by a conductive strand 30 that is wrapped around the core (e.g., a coil wrapped around fabric 22 in the example of FIG. 20). This type of electromagnet may be used in place of permanent magnets (e.g., magnet 42 of FIGS. 13, 14, 16, 17, and/or 19, magnets in portions 22A and 22B of FIG. 17, etc.).

If desired, haptic output devices such as the haptic output device of FIG. 19 and/or other electromagnetic devices may be operated as energy harvesting devices (e.g., by operating the devices "in reverse"). Such devices may include permanent magnets and electromagnets. Permanent magnets may be formed from fabric (e.g., layers of fabric with strands of magnetic material and/or magnetic binder such as magnet 42 of FIG. 19) and/or may be formed from magnetized pieces of magnetic material (e.g., magnet 42 may be a permanent magnet formed from a member containing magnetized magnetic material). Electromagnets may be formed from fabric 22 (see, e.g., FIG. 20) and/or other structures (e.g., solid magnetic material members may be used in forming cores for electromagnets such as electromagnet 84 of FIG. 20) and may be wrapped with wire forming coils. A fabric-based spring of the type shown in FIG. 19 or other support structure (e.g., a metal spring, a rotating axle, a track that allows masses to slide with respect to each other, a layer of fabric, etc.) may be used to support the electromagnet(s) and/or permanent magnet(s) of the electromagnetic energy harvesting device while allowing these components to move relative to each other. As an example, electromagnets may be supported on a layer of fabric and a portion of the fabric may be used in forming a spring that couples the permanent magnet to the electromagnets. During motion of device 10, the permanent magnet in the electromagnetic device will move relative to the electromagnet, thereby creating a changing magnetic field in the electromagnet that induces a corresponding current in the coil of the electromagnet. This coil current can be used to power circuitry in device 10 (e.g., to recharge a battery or to charge an energy storage device such as a capacitor, to power input-output devices and control circuitry, etc.). By harvesting energy using haptic output devices operated in reverse and/or by harvesting energy using dedicated electromagnetic energy harvesting components, battery life for device 10 may be extended.

Figure 21:
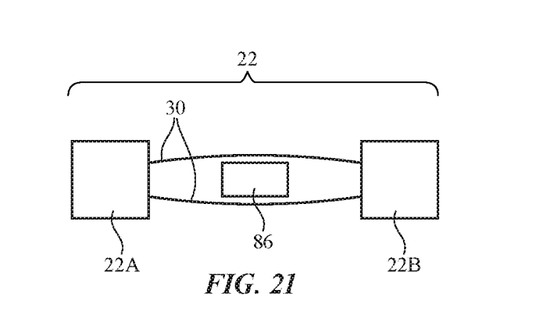
FIG. 21 is a side view of an illustrative fabric actuator with a magnetic element such as an electromagnet or permanent magnet suspended between supporting strands of material in accordance with an embodiment.

FIG. 21 shows how a fabric actuator may have a magnetic structure 86 that is suspended between fabric portions 22A and 22B using strands 30. Portions 22A and/or 22B may be configured to form fixed magnets 42 and/or electromagnets 84 (e.g., fixed fabric magnets and/or fabric electromagnetics) and magnetic structure 86 may be formed from one or more layers of fabric 22 that form a fixed magnet and/or an electromagnet.

In general, fabric actuators may have a moving mass formed from an electromagnet and/or a permanent magnet and may have opposing magnetic structures (e.g., permanent magnets and/or electromagnets). Haptic output may be created by using control circuitry 16 to apply drive signals to the electromagnet(s). Optional springs formed from woven strands 30, knit strands 30, supportive strands such as strands 30 of FIG. 21, sheets of fabric (e.g., fabric layers formed into a wavy spring shape), and/or other strands.

If desired, a haptic output device may be formed from fabric 22 having multiple layers (e.g., see, e.g., illustrative layers 22L of fabric 22 of FIG. 20). Fabric 22 may, as an example, have layers of a first material (e.g., a dielectric) that alternate with layers of a second material (e.g., conductive layers). The conductive layers may serve as electrodes that are used in applying electric fields to the dielectric layers.

Dielectric layers and conductive layers may be formed, for example, by weaving fabric 22 from dielectric strands and conductive strands. The layers of the first material may be formed from intertwined strands of the first material and the layers of the second material may be formed from intertwined strands of the second material. Configurations in which fabric layers of the first or second material are respectively alternated with solid sheets of the second or first material may also be used.

In an illustrative configuration, fabric 22 contains alternating fabric layers of dielectric and conductor that are woven together to form a stack of layers. Fabric 22 may contain any suitable number of layers (e.g., at least three, at least five, at least ten, fewer than fifteen, fewer than nine, etc.). The dielectric fabric layers of fabric 22 may be formed from strands of piezoelectric material (e.g., piezoelectric ceramic strands that are intertwined by weaving or other strand intertwining techniques) or electroactive polymer strands (electroactive polymer strands that are intertwined by weaving or other strand intertwining techniques). Each dielectric layer may exhibit a change in shape (e.g. a change in thickness) as a function of applied electric field. The conducting fabric layers may be formed from strands of metal, polymer coated with metal, and/or other conductive strands.

Fabric 22 that forms a haptic device based on alternating dielectric (insulating) and conducting layers may be incorporated into any suitable item (e.g., clothing, a cover or case, etc.). The conductive fabric layers of fabric 22 alternate with the dielectric fabric layers. Strands of the dielectric material may be intertwined with the strands of conductive material so that the fabric layers are joined together to form fabric 22. During operation, electric control signals (e.g., voltages) can be applied to the conductive fabric layers by control circuitry 16. The conductive fabric layers serve as electrodes. Electric fields that are associated with the electric control signals are applied to the dielectric layers using the electrodes. The dielectric material exhibits changes in shape (e.g., length, thickness, etc.) as a function of applied electric field. By adjusting the magnitude of the control signals, the magnitude of the electric field and therefore the haptic output response of the haptic output device formed from fabric 22 may be controlled. As an example, a portion of an item that is formed at least partly of fabric 22 may vibrate or otherwise produce haptic output (e.g., to serve as haptic feedback, to provide a user with an alert, etc.).

Figure 22:
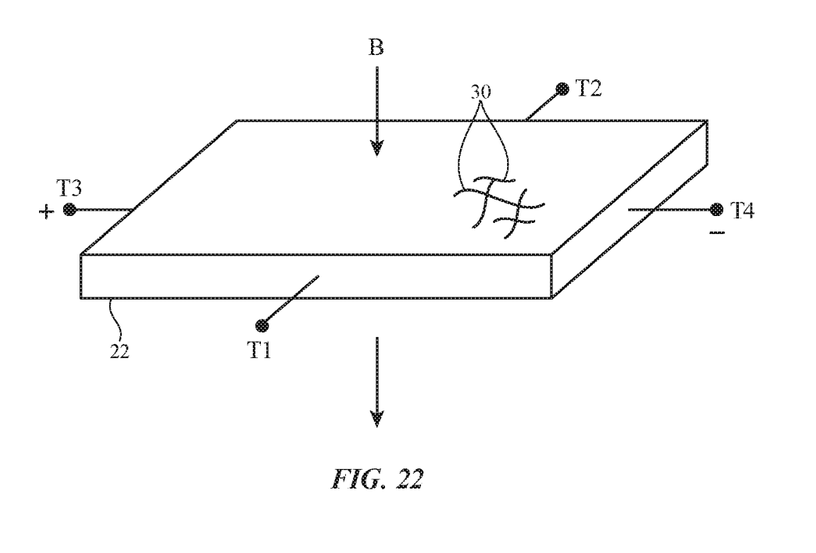
FIG. 22 is a perspective view of an illustrative fabric Hall effect sensor in accordance with an embodiment.

If desired, electrical components other than fabric actuators may be formed from fabric 22. Consider, as an example, the arrangement of FIG. 22 in which fabric 22 has been used to for a Hall effect sensor. As shown in FIG. 22, fabric 22 may include strands 30 that are joined by weaving, knitting, braiding, or other strand intertwining techniques. Fabric 22 may, if desired, include binder material and may include multiple layers of fabric that are joined by strand intertwining and/or binder material. The materials in fabric 22 may, for example, include semiconductors or other materials (e.g., conductors) that exhibit Hall effect properties (e.g., so that fabric 22 forms a Hall effect sensor). During operation of device 10, control circuitry 16 supplies a voltage across terminals T3 and T4 that causes a current to flow through fabric 22. Control circuitry 16 also measures the voltage across terminals T1 and T2. In the presence of a magnetic field B, a non-zero voltage develops across terminals T1 and T2 that is proportional to the magnitude of magnetic field B. In this way, the fabric Hall effect sensor of FIG. 22 may be used in measuring magnetic fields. The fabric Hall effect sensor may be used as part of a magnetic switch or other electrical component in device 10. For example, the fabric Hall effect sensor may be used to measure a magnetic field produced by a region of magnetized fabric or other permanent magnet (e.g., to detect opening and closing of a fabric cover).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An actuator, comprising:
   first and second fabric support structures;
   a magnet; and
   first and second springs, each including a strand of material that passes from the first and second fabric support structures, respectively, to the magnet.

2. The actuator defined in claim 1 further comprising a coil configured to generate electromagnetic fields to move the magnet, wherein the coil is formed from a conductive strand in the fabric.

3. The actuator defined in claim 1 wherein the magnet comprises a fabric magnet.

4. The actuator defined in claim 3 wherein the fabric magnet comprises intertwined strands of magnetic material.

5. The actuator defined in claim 3 wherein the fabric magnet comprises intertwined strands of material, polymer binder, and magnetic material in the polymer binder.

6. The actuator defined in claim 3 wherein the first spring comprises strands of material intertwined with the fabric magnet and the first fabric support structure.

7. The actuator defined in claim 6 further comprising a coil formed from a strand of conductive material in a fabric structure.

8. The actuator defined in claim 1 wherein the first and second springs comprise woven fabric.

9. The actuator defined in claim 1 wherein the first and second springs comprise knit fabric.

10. A fabric actuator, comprising:
    a fabric permanent magnet;
    a fabric electromagnet formed from a coil in fabric, wherein the coil extends around the fabric permanent magnet; and
    a spring coupling the permanent magnet to the electromagnet.

11. The fabric actuator defined in claim 10 wherein the spring comprises intertwined strands of material.

12. The fabric actuator defined in claim 11 wherein the spring forms part of a pair of springs that are each coupled between a corresponding fabric support structure and the fabric permanent magnet.

13. The fabric actuator defined in claim 12 wherein the springs are formed from woven fabric.

14. The fabric actuator defined in claim 12 wherein the springs are formed from knit fabric.

15. The fabric actuator defined in claim 10 wherein the fabric permanent magnet comprises a layer of fabric including polymer binder with magnetic filler.

16. The fabric actuator defined in claim 10 wherein the fabric electromagnet comprises a magnetic core formed from binder with magnetic filler.

17. An item, comprising:
    a fabric support structure;
    a fabric spring;
    a permanent magnet coupled to the fabric support structure by the fabric spring; and
    a fabric electromagnet formed from a conductive coil intertwined with strands of material, wherein the fabric electromagnet is configured to produce a magnetic field that moves the permanent magnet in and out of a plane in which the fabric electromagnet lies.

18. The item defined in claim 17 further comprising:
    fabric that is used in forming the fabric support structure, the fabric spring, and the fabric electromagnet.

19. The item defined in claim 18 wherein the fabric is configured to be worn on a body part of a user.

20. The item defined in claim 18 wherein the fabric comprises fabric configured to form a structure selected from the group consisting of: a portable electronic device cover housing, a voice-controlled speaker housing, a charging mat housing, a computer housing, a seat, and a band.

21. An item, comprising:
    a fabric electromagnet;
    a permanent magnet that is formed from strands of material and that is configured to move relative to the fabric electromagnet, wherein the fabric electromagnet includes a coil that extends around the permanent magnet;
    a spring coupling the fabric electromagnet to the permanent magnet; and
    circuitry configured to be powered by current produced by the fabric electromagnet when the permanent magnet moves relative to the fabric electromagnet.

22. The item defined in claim 21 wherein the permanent magnet comprises binder formed from magnetic material.

23. An item, comprising:
    control circuitry; and
    a haptic output device controlled by the control circuitry, wherein the haptic output device comprises fabric having alternating fabric layers of dielectric strands and conducting strands, respectively, and wherein the layers of conducting strands are configured to apply an electric field to the layers of dielectric strands to change a thickness of the layers of dielectric stands.

24. The item defined in claim 23 wherein the dielectric strands comprises piezoelectric material.

25. The item defined in claim 24 wherein the piezoelectric material comprises piezoelectric ceramic.

26. The item defined in claim 23 wherein the dielectric strands comprise electroactive polymer strands.

27. The item defined in claim 23 wherein the fabric layers of dielectric strands comprise electroactive polymer layers and wherein the fabric layers of conducting strands are configured to form electrodes that receive control signals from the control circuitry.

* * * * *